United States Patent [19]

Onda et al.

[11] Patent Number: 4,903,059
[45] Date of Patent: Feb. 20, 1990

[54] CAMERA

[75] Inventors: Kazuhiko Onda; Masayoshi Hirai; Tetsuo Nishizawa; Muneyoshi Sato, all of Saitama; Nobuyuki Kameyama, Tokyo; Haruo Onozuka, Saitama; Masashi Takamura, Tokyo; Takashi Kamoda, Saitama; Kiyotaka Kobayashi, Tokyo, all of Japan

[73] Assignee: Fuji Photo Film Co., Ltd., Kanagawa, Japan

[21] Appl. No.: 241,206

[22] Filed: Sep. 7, 1988

[30] Foreign Application Priority Data

Sep. 7, 1987 [JP] Japan .................. 62-223655
Sep. 7, 1987 [JP] Japan .................. 62-223656
Sep. 7, 1987 [JP] Japan .................. 62-223657
Sep. 7, 1987 [JP] Japan .................. 62-223658
Sep. 7, 1987 [JP] Japan .................. 62-136681
Mar. 1, 1988 [JP] Japan .................. 63-48228

[51] Int. Cl.⁴ .............................................. G03B 1/18
[52] U.S. Cl. ............................ 354/173.1; 354/214
[58] Field of Search ................ 354/173.1, 173.11, 214

[56] References Cited

U.S. PATENT DOCUMENTS

4,610,522 9/1986 Tobioka et al. .................. 354/173.1
4,724,450 2/1988 Miyawaki et al. ............... 354/173.1

Primary Examiner—L. T. Hix
Assistant Examiner—Brian W. Brown
Attorney, Agent, or Firm—Young & Thompson

[57] ABSTRACT

A camera is disclosed which is capable of winding and rewinding a film and adjusting a focal distance by use of a single motor. In the camera, the forward rotation of the motor is used to wind the film, and when the film winding operation is completed after termination of photographing, on detecting the end of the film, a torque detect mechanism switches a planetary clutch mechanism to connect the motor with a film rewinding mechanism. Thus, it is possible to perform both the film winding and rewinding operations by use of the rotation of the motor in the same direction. Also, when, with the planetary clutch mechanism connected with the film winding mechanism, the motor is rotated reversely, then the power transmission system is switched over to a focal distance varying mechanism, whereby the focal distance can be adjusted.

10 Claims, 8 Drawing Sheets

CAMERA

BACKGROUND OF THE INVENTION

1. FIELD OF THE INVENTION

The present invention relates to a camera in which film winding, film rewinding, focal distance adjustment and lens barrel driving can be performed by a single electric motor.

2. DESCRIPTION OF RELATED ART

Recently, with the progress of automation of a camera, frame-by-frame winding of a film in photographing, rewinding of the film after completion of the photographing, changing of the focal distance of a taking lens and other similar operations have been electrified.

For example, in U.S. Pat. No. 4,601,563, there is disclosed a camera comprising an electric motor which winds a film in the forward rotation thereof and rewinds the film in the reversed rotation thereof, clutch means which can switch power from gears extending from the electric motor to a rewind fork in order to move a lens barrel, and a switch responsive to the power switching of the clutch means to rotate the motor in the reverse direction, wherein the motor is rotated in the reverse direction by means of the power switching of the clutch means to move the lens barrel.

However, in the above-mentioned camera, due to the fact that the film is wound in the forward rotation of the motor and the film is rewound in the reverse rotation of the motor, a control circuit for switching the forward and reverse rotations of the motor and switching means for driving the lens barrel are complicated.

In other words, in above camera, since the forward rotation of the motor is used to wind the film and the reverse rotation is used to rewind the film, there is necessary the clutch means in order to take out the power for driving the lens barrel from the gears extending from the motor to the rewind fork, which results in the complicated control circuit and switching means as mentioned above.

Here, if the forward rotation of the motor can be used to perform two operations, that is, the film winding and rewinding operations, then the reverse rotation of the motor can be used for another task. Specifically, if this is used for driving of the lens barrel, the control circuit and switching mechanism can be simplified to a great extent.

SUMMARY OF THE INVENTION

The present invention aims at eliminating the drawbacks found in the above-mentioned prior art camera.

Accordingly, it is an object of the invention to provide a camera in which film winding and rewinding operations are performed by the rotation of an electric motor in one direction to thereby simplify a control circuit for the motor.

To attain the above object, according to the invention, there is provided a camera which includes a planetary clutch mechanism for transmitting the rotational power from the electric motor to a film winding mechanism or a film rewinding mechanism and performs the film winding and rewinding operations by use of the rotational power of the electric motor in the same direction, characterized in that there is provided a planetary gear mechanism in a power transmission mechanism connecting the electric motor with the planetary clutch mechanism and also that, when a given torque is detected at the time when the winding of the whole film is completed, an arm in the planetary gear mechanism is rotated to switch the planetary gear clutch mechanism from the film winding mechanism over to the film rewinding mechanism.

In the present invention, the forward rotation of the electric motor is used to carry out the film winding operation and, when the film winding is completed after completion of photographing, if the end of the film is detected, then the arm of the planetary gear mechanism is rotated to switch the planetary clutch mechanism from the film winding mechanism and connect the electric motor with the film rewinding mechanism. Thanks to this, both operations to wind and rewind the film can be executed by the rotation of the electric motor in one direction.

Also, in order to achieve the above object, according to the invention, there is provided a camera which can perform film winding and rewinding operations by the rotation of an electric motor in the same direction, the camera comprising: a planetary clutch mechanism for transmitting the rotational power from the electric motor to a film winding mechanism or a film rewinding mechanism; an engagement member for holding the planetary clutch mechanism so as to connect the planetary clutch mechanism with the film winding mechanism; and, a torque detect mechanism which, on detecting a given torque at the time of completion of winding of the whole film, drives the engagement member to remove the holding of the planetary clutch mechanism and connects the planetary clutch mechanism with the film rewinding mechanism.

In the invention, the forward rotation of the electric motor is used to wind the film and, at the time of completion of the film winding operation after completion of photographing, when the end of the film is detected by the torque detect mechanism, the planetary clutch mechanism is switched to connect the electric motor with the film rewinding mechanism. Thanks to this, the two operations for winding and rewinding the film can be carried out by the one-direction rotation of the electric motor.

Also, when, with the planetary clutch mechanism being connected with the film winding mechanism, the electric motor is rotated in the reverse direction, then the power transmission system of the invention can be changed over to provide a focal distance switching mechanism so as to be able to adjust the focal distance.

In attaining the above object, according to another aspect of the invention, there is provided a camera, comprising: a film winding mechanism for drawing out a film stored in a patrone therefrom and rolling it round a spool; a film rewinding mechanism for rewinding the film from the spool into the patrone; a first planetary clutch mechanism for transmitting the rotational power from an electric motor to the film winding mechanism or the film rewinding mechanism by means of the forward rotation of the electric motor; an engagement member for holding the first planetary clutch mechanism so as to connect the first planetary clutch mechanism with the film winding mechanism; a torque detection mechanism, on detecting a given torque at the time of completion of the winding of the whole film, for driving the engagement member to remove the holding of the first planetary clutch mechanism and connect the first planetary clutch mechanism with the film rewinding mechanism; a focal distance varying mechanism for drawing out or in a taking lens barrel to vary a focal distance; and, a second planetary clutch mechanism for switching the rotational power from the electric motor from the film winding mechanism over to the focal length varying mechanism by means of the reverse rotational power of the electric motor.

In the invention, the forward rotation of the electric motor is used to wind the film and, at the end of the film winding operation after completion of photographing, if the end of the film is detected by the torque detect mechanism, then the first planetary clutch mechanism is switched and the electric motor is connected with the film rewinding mechanism. Thanks to this, both operations for winding and rewinding the film can be carried out by the forward rotation of the electric motor.

Also, if the electric motor is rotated in the reverse direction, then the second planetary clutch mechanism is switched from the film winding mechanism over to the focal distance varying mechanism, so that the focal distance can be adjusted.

It is another object of the invention to provide a camera in which winding and rewinding of a film can be executed by the rotation of a motor in one direction and the zoom switching (or tele-wide switching) of a lens barrel can be performed by the rotation of the motor in the reverse direction to thereby simplify a control circuit in the motor or the switching mechanism of the lens barrel and also in which, after the film is rewound, the lens barrel can be driven without a resetting operation.

In order to achieve the above object, according to still another aspect of the invention, there is provided a camera in which winding and rewinding of a film can be performed by use of the rotation of an electric motor in the same direction, comprising: a first planetary clutch mechanism including a sun gear, an arm journaled coaxially with the sun gear and a planetary gear intermeshing with the sun gear and journaled by the arm for transmitting the rotational power from the electric motor to a film winding mechanism or a film rewinding mechanism; a switch lever journaled coaxially with the arm for opening or closing a switch to detect the state of winding or rewinding of the film; an elastic member for energizing the switch lever in the direction of detection of the state of the film rewinding; a focal distance changing mechanism for driving a lens barrel; a second planetary clutch mechanism for transmitting the rotational power from the electric motor to the film winding mechanism or the focal distance changing mechanism; and engagement member for holding the arm of the first planetary clutch mechanism so as to connect the planetary gear of the first planetary clutch mechanism with the film winding mechanism and also for holding the switch lever against the energizing force of the elastic member; and a torque detect lever, on detection of a given torque at the time of completion of the winding of the whole film, for driving the engagement member to remove the holding of the arm of the first planetary clutch mechanism and the switch lever so as to connect the planetary gear of the first planetary clutch mechanism with the film rewinding mechanism.

According to the invention, after the rewinding of the film, the power transmission system can be switched over to the focal distance changing mechanism to thereby move the lens barrel without performing any reset operation such as opening of the back cover.

It is yet another object of the invention to provide a camera which can make effective use of the space thereof to thereby obtain a large reduction ratio.

To accomplish the above object, according to yet another aspect of the invention, there is provided a camera in which a taking lens barrel can be moved from an electric motor through a gear transmission mechanism, comprising: a first plane gear transmission mechanism disposed in a plane parallel to the upper surface of the camera and having an input side connected with the output gear of the electric motor; a second plane gear transmission mechanism disposed in a plane parallel to the side surface of the camera and having an output side connected with the drive member of the taking lens barrel; and gear mechanism for connecting the first and second plane gear transmission mechanism with each other.

In the present invention, the first plane gear transmission mechanism is disposed in the plane parallel to the camera upper surface, the second plane gear transmission mechanism is disposed in the plane parallel to the camera side surface, and these two plane gear transmission mechanisms are connected with each other by the gear mechanism, so that the space of the camera can be used effectively and a large reduction ratio can be obtained.

It is a further object of the invention to provide a camera in which a planetary gear in a planetary clutch mechanism is prevented from biting deep or escaping from a driven gear with which the planetary gear intermeshes.

In order to attain the above object, according to a further aspect of the invention, there is provided a camera in which the rotational power of an electric motor in one direction is transmitted through a planetary clutch mechanism to a gear train on a tele-side or on a wide side to thereby advance or retreat a taking lens barrel, characterized in that a planetary gear in the planetary clutch mechanism is arranged so as to be able to make one revolution round the outer periphery of a sun gear and to intermesh with driven gears in the tele-side gear train and in the wide side gear train, and also that there is provided a stopper mechanism for restricting the intermeshing position of the planetary gear with the driven gear on the tele-side gear train or on the wide side gear train when operating a zoom knob.

In the present invention, there is provided the planetary clutch mechanism for switching the tele-side and wide side of a focal distance varying mechanism, the planetary gear in the planetary clutch mechanism is able to make one revolution round the outer periphery of the sun gear and is also disposed to be engageable with the driven gears in the tele-side gear train an in the wide side gear train, and there is provided a stopper mechanism which is rotatable responsive to the operation of the operation of the externally arranged knob to restrict the engagement position of the planetary gear with the driven gear in the tele-side gear train or in the wide side gear train. Therefore, due to the fact that, in the tele-operation or wide operation of the camera, the planetary gear in the planetary clutch mechanism is arranged such that it can make one revolution round the outer periphery of the sun gear and also that it is engageable with the driven gears in the wide side gear train and in the tele-side gear train, there can be obtained between the planetary gear and the driven gears a neutral position relationship in which the planetary gear does not bite deep the driven gears nor escapes from the driven gears. By means of rotation of the stopper mechanism for restricting the engagement or intermeshing position of the planetary gear, the engagement of the planetary gear with the gear train on the tele-side or on the wide side can be assured. Also, the taking lens barrel can be advanced or retreated in the tele-wide directions by means of rotation of the motor in one direction.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiments of a camera according to the present invention with reference to the accompanying drawings.

Figure 1:
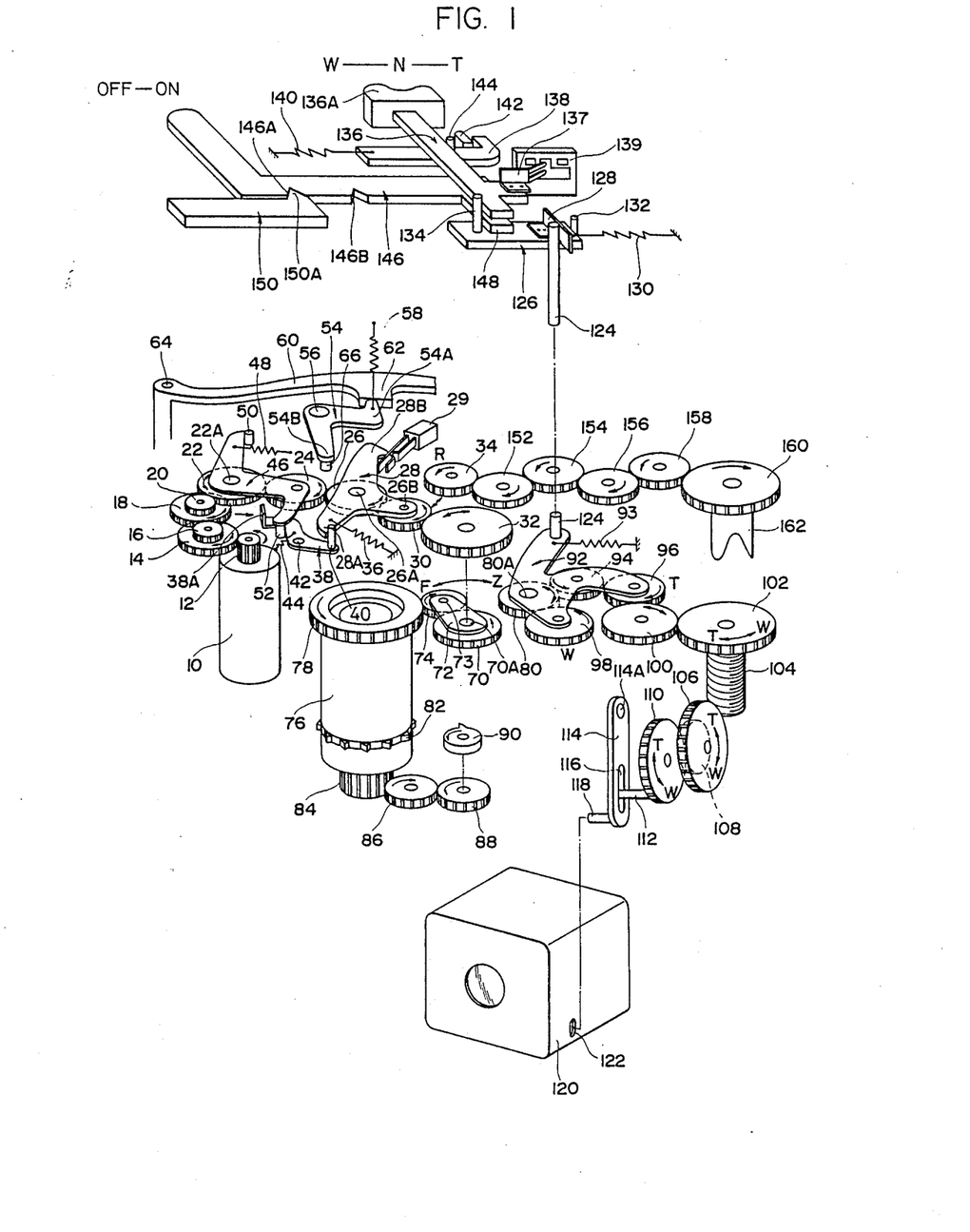
FIG. 1 is a perspective view of a gear transmission mechanism in a film feed device for use in a camera according to the invention.

Referring first to FIG. 1, an electric motor, designated by 10, has an output gear 12 which is connected through gears 14, 16, 18, 20, 22, 24 to a sun gear 26. An arm 28 is journaled on a central shaft 26A of the sun gear 26 and on the end of the arm 28 there is planted a pin 26B. A planetary gear 30, which is journaled on the pin 26B, is in engagement with the sun gear 26. The sun gear 26, arm 28 and planetary gear 30 form a first planetary clutch mechanism. The planetary gear 30 can be switched over to either a gear 32 in a film winding mechanism or a gear 34 in a film rewinding mechanism according to the direction of rotation of the sun gear 26.

On one end 28A of the arm 28 there is mounted a spring 36 which energized the planetary gear 30 in a direction to intermesh with the gear 34 in the rewinding mechanism. This spring 36, as will be discussed later, is provided to rotate the arm 28 counter-clockwise to thereby turn on the switch 29 so as to rotate the motor 10 in a manual rewinding operation and thus it is not necessary in an auto-rewinding operation. On one hand, with the end 28A of the arm 28 in engagement with a pin 40 planted on an engagement lever 38, the planetary gear 30 is held in a direction to intermesh with the gear in the winding mechanism against the switching force of the planetary gear 30 due to the rotation of the sun gear 26 and the energizing force of the spring 36. On the other hand, the arm 28, is provided with a projection 28B for turning a switch 29 on or off and, if the arm 28 is rotated in a counter-clockwise direction, then the switch 29 can be changed over from on to off. This switch 29 serves as a switch to detect the winding or rewinding state in the auto-rewinding operation, and as a drive switch to rotationally drive the motor 10 in the manual rewind operation. The engagement lever 38 is rotatably journaled about a shaft 42 and is also energized by a spring 44 so as to rotate in the counter-clockwise direction about a spring 44, whereby the planetary gear 30 is held in the direction to intermesh with the gear 32 in the film winding mechanism.

On the other hand, a torque detect lever 46, which is journaled on a shaft 22A of the gear 22, is rotationally energized in a clockwise direction by a spring 48 and is also in contact with a stopper 50. On the end of the torque detect lever 46 there is planted a pin 52 which is in contact with the engagement lever 38. Therefore, if the rotation of the sun gear 26 is caused to stop owing to a film end which will be discussed later, then the gear 24 and torque detect lever 46 are rotated in the counter-clockwise direction round the sun gear 22 about the shaft 22A thereof against the energizing force of the spring 48 by means of the rotational power of the motor 10, whereby the engagement lever 38 is caused to rotate in the clockwise direction about the shaft 42 to remove the engagement between the end 28A of the arm 28 and the pin 40, so that the planetary gear 30 is brought into engagement with the gear 34 in the rewinding mechanism thanks to the switching force caused by the rotation of the sun gear 26. As discussed before, in the auto-rewinding operation, even if the spring 36 does not act, due to the switching force caused by the rotation of the gear 26, the gear 30 is able to mesh with the gear 34.

On the other end of the engagement lever 38 there is formed a bent portion 38A. By operating the bent portion 38A from outside of the camera to energize it rotationally in the direction of an arrow shown in FIG. 1, the engagement between the pin 40 and arm 28 can be removed. As a result of this, the arm 28 is rotated in the counter-clockwise direction by the energizing force of the spring 36 to rotate the motor 10, so that the manual rewinding operation can be executed.

Figure 4:
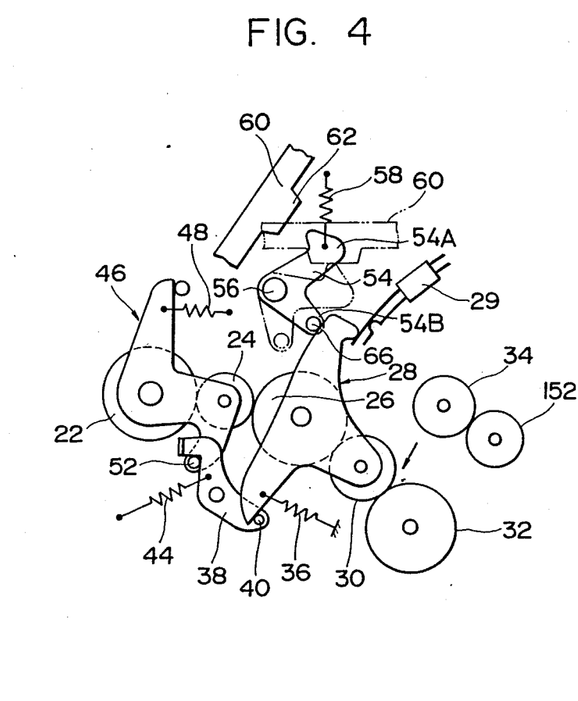
FIG. 4 is a plan view to illustrate a state in which a resetting operation is carried out by opening a back cover.

A back cover opening/closing detect lever 54 is journaled rotatably about a shaft 56 and is energized by a spring 58 such that it is rotatable about the shaft 56, with the end 54A thereof in contact with the receiving portion 62 of a back cover 60. Therefore, as shown by a solid line in FIG. 4, if the back cover 60 is rotated about a opening/closing shaft 64 and is opened, then the back cover opening/closing detect lever 54 is removed from the restraint by the back cover 60 and thus, as shown by a solid line in FIG. 4, the back cover opening/closing detect lever 54 is rotated in the counter-clockwise direction about the shaft 54 by means of the energizing force of the spring 58. This allows a pin 66 planted on the other end 54B of the lever 54 to press against the arm 28 and rotate it forcibly in the clockwise direction in FIG. 4 to thereby disengage the planetary gear 30 out of the gear 34 in the rewinding mechanism and bring the gear 30 into engagement with the gear 32 in the winding mechanism, so that the gear 30 can be held by the engagement lever 38. This completes the resetting.

As shown in FIG. 1, a sun gear 70 is mounted to the shaft of the gear 32 in the film winding mechanism integrally therewith and the sun gear 70 has a shaft 70A on which an arm 72 is journaled. On the arm 72, there is planted a pin 73 on which a planetary gear 74 is journaled. The sun gear 70, arm 72 and planetary gear 74 form a second planetary clutch mechanism. The planetary gear 74 is engageable with either a spool gear 78 provided on the upper end of a spool 76 or a gear 80 in the focal distance changing mechanism by switching the rotation of the motor 10 in the forward or reverse direction. The spool 76 is provided in the outer periphery thereof with a claw 82 engageable with perforations in a film and is also provided in the lower end portion thereof with a gear 84, which gear 84 is in engagement with gears 86, 88. Coaxially with the gear 88 there is provided a one-tooth gear 90 which is used to perform a film initial feed until the leader portion of the film is wound by the claw 82 of the spool 76.

Next, description will be given of the focal distance changing mechanism. The gear 80 has a shaft of rotation 80A which is provided with a lever 92 for switching the driving direction of the lens barrel. On the switch lever 92 there are journaled gears 94, 98 engageable with the gear 80 as well as gear 96 engageable with the gear 94. The gears 80, 94 and 96 form a gear train when the lens barrel is driven in the tele-direction, while the gears 80, 98 form a gear train when the lens barrel is driven in the wide direction. Therefore, by rotating the switch lever 92 about the shaft 80A, the gear 96 for the tele-direction can be brought into engagement with a gear 100 or the gear 98 for the wide direction can be brought into contact with the gear 100. It should be noted here, however, that the switch lever 92 is normally energized and held in the tele-direction because it is always energized rotationally in the clockwise direction by a spring 93.

Further, the gear 100 meshes with a gear 102 which is provided with a worm 104. The worm 104 meshes with a gear 106 and a gear 108, which is formed coaxially with the gear 106, meshes with an encoder gear 110. On the encoder gear 110 there is planted a pin 112 at a position eccentric from the encoder gear and the pin 112 is in engagement with a lens barrel draw-out lever 114. That is, the lens barrel draw-out lever 114 is supported such that it free to swing about a shaft 114A and it is also formed with an elongated bore 116 into which the pin 112 extending from the encoder gear 110 is fitted. Therefore, by means of rotation of the encoder 110, the lens barrel draw-out lever 114 is able to swing about the shaft 114A. On the lower end portion of the lens barrel draw-out lever 114 there is planted a pin 118 which is fitted into an elongated bore 122 formed in a lens barrel 120. Therefore, by means of the swing motion of the lens barrel draw-out lever 114, the lens barrel 120 can be moved back and forth.

Next, description will be given of the zoom switch mechanism. On the end of the lens barrel driving direction switch lever 92 there is planted a pin 124 which is in contact with a projection piece 128 provided in a first slide lever 126. The first slide lever 126 is drawn in the right direction by a spring 130 and is also in contact with a stopper 132. The spring 130 is arranged such that it gives an energizing force in the return direction when the zoom switch lever 136 is held at the wide position. On the other hand, there is planted a pin 134 on the other end of the slide lever 126 and the pin 134 is in engagement with the zoom switch lever 136. The zoom switch lever 136 is provided on the lower surface thereof with a second slide lever 138 which is drawn in the left direction by a spring 140 and can also be abutted against a stopper 142. There is planted on the slide lever 138 a pin 144 which is in engagement with the zoom switch lever 136. The spring 140 is arranged such that it gives an energizing force in the return direction when the zoom switch lever 136 is held at the tele-position. Further, the zoom switch lever 136 is provided with a movable contact piece 137 which cooperates with a print plate 139 to form a tele-wide switch.

Further, the end portion 148 of a main switch lever 146 is in engagement with the pin 134 of the first slide lever 126 and the main switch lever 146 can take two positions, that is, an OFF position and an ON position. At the respective position, projections 150A provided in a click lever 150 can be fitted into recessed portions 146A, 146B formed in the main switch lever 146 and can also be retained there.

When the zoom switch lever 136 is moved from its neutral position N to a tele-position T, then, while the first slide lever 126, switch lever 92, and gear trains 94, 96 remain unchanged, only the tele-wide switch 137, 139 is turned on to drive the motor 10 in the reverse direction, thereby executing the tele-operation.

On the other hand, if the zoom switch lever 136 is moved from the neutral position N to a wide position W, then the projection piece 128 of the first slide lever 126 moves the pin 124 in the left direction and, responsive to this, the switch lever 92 is rotated counter-clockwise about the shaft 80A to connect the gear 98 in the gear train on the wide side with the gear 100 and, at the same time, the tele-wide switch 137, 139 is turned on to drive the motor 10 in the reverse direction, thereby executing the wide operation.

Next, description will be given below of the rewinding mechanism. The gear 34 in the rewinding mechanism is connected with gears 152, 154, 156, 158 and 160. The gear 160 is provided on the lower surface thereof with a patrone fork 162 which is engageable with the winding core of a film patrone.

Now, description will be give of the operation of the illustrated embodiment of a feed device employed in the camera according to the invention which is contructed in the above-mentioned manner.

Figure 2:
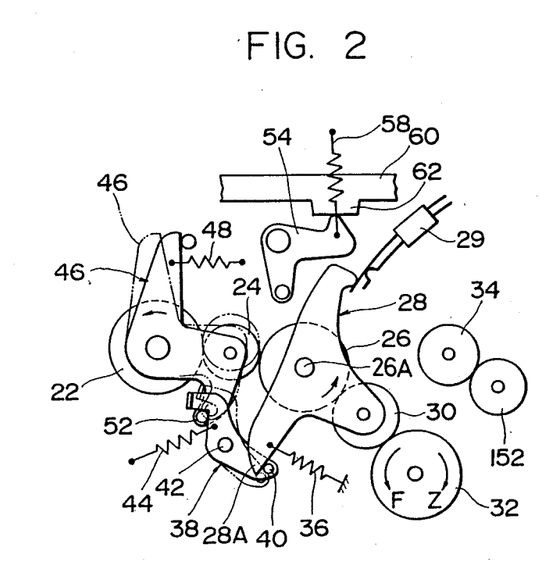
FIG. 2 is a plan view to illustrate the operation of a torque detect mechanism in a film winding mode.

At first, we will explain a film winding operation. Due to the energizing forces of the spring 44 of the engagement lever 38 and the spring 48 of the torque detect lever 46, the engagement lever 38 and torque detect lever 46 respectively take such positions as shown in FIG. 1 and FIG. 2 with the result that the arm 28 is located at a position shown in FIG. 1 against the energization force of the spring 36 and, therefore, the planetary gear 30 is in engagement with the gear 32 in the film winding mechanism. In this state, if the motor 10 is rotated in the forward direction (that is, in the clockwise direction), then the rotational power of the motor 10 is transmitted to the film winding mechanism by means of a gear train of the gears 12→14→16→18→20→22→24→26→30→32. As a result of this, the spool 76 is rotated in the counter-clockwise direction by means of the gear train of the gears 32→70→74→78 in the film winding mechanism, so that a film (not shown) is wound round the spool 76.

Figure 3:
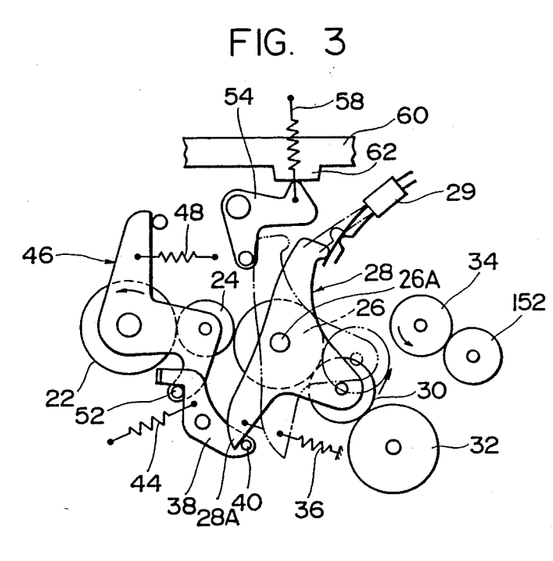
FIG. 3 is an explanatory view to illustrate the torque detect mechanism in a film rewinding mode.

The film rewinding operation is performed in the following manner. When the photographing is completed and the whole length of the film is wound round the spool 76, then the end of the film is in engagement with the winding core in the film patrone and, therefore, at the end of the film winding, the spool 76 is prevented against rotation in spite of the rotational power of the motor 10. In this state, if the motor 10 tries to rotate further, then, due to the rotational torque from the motor 10, the torque detect lever 46, 46, as shown by an imaginary line in FIG. 2, is rotated in the counter-clockwise direction about the shaft 22A against the energizing force of the spring 48. When the torque detect lever 46 is rotated counter-clockwise, then the engagement lever 38 is rotated clockwise about the shaft 42 against the energizing force of the spring 44 since it is in contact with the pin 52 on the torque detect lever 46. The clockwise rotation of the engagement lever 38 removes the engagement between the pin 40 in the engagement lever 38 and the end portion 28A of the arm 28, whereby the arm 28, as shown by an imaginary line in FIG. 3, is rotated counter-clockwise about the shaft 26A by the spring 36 and thus the planetary gear 30 is caused to intermesh with the gear 34 in the rewinding mechanism. As a result of this, the motor 10 and the rewinding mechanism are brought into connection with each other and then the patrone fork 162 is rotated by the gear train of the gears 12→14→16→18→20→22→24→26→30→34→152→154→156→158→160 and the film is rewound into the patrone.

As described above, with the embodiment according to the invention, when the film is wound round the spool 76 by means of the forward rotation of the motor 10 and, after the film is wound, the end of the film is detected, then the torque detect lever 46 is operated and thus the film can be rewound into the patrone by means of the forward rotation of the motor 10. Accordingly, in the embodiment according to the invention, the forward rotation of the motor 10 can be used to perform both the film winding and rewinding operation.

Next, we will explain the operation of the focal distance changing mechanism. At first, when a zoom knob 136A of the zoom switch lever 136 is set at the neutral position N, the zoom direction switch lever 92, as discussed above, is situated on the tele-side due to the action of the spring 93, but the tele-wide switch 137, 139 is OFF so that the motor 10 is prevented against rotation. Then, if the zoom knob 138A is held at the tele-position T against the energizing force of the spring 140, then the tele-wide switch 137, 139 is turned ON to rotate the motor 10 in the reverse direction (that is, in the counter-clockwise direction), the rotational power from the motor 10 is transmitted to the gear 32 by means of the gears 12→14→16→18→20→22→24→26→30→32 as the clockwise rotational power. If the gear 32 is rotated in the clockwise direction, then the planetary gear 74 is rotated in the counter-clockwise direction, whereby the arm 72 is rotated in the clockwise direction to cause the planetary gear 74 to mesh with the gear 80 in the focal distance changing mechanism. When the gear 74 intermeshes with the gear 80, then, due to the fact that the switch lever 92 is already positioned on the tele-side, the rotational power from the motor 10 is transmitted to the lever 114 by means of the gears 80→94→96→100→102→104→106→108→110 to rotate the lever 114 clockwise about the shaft 114A thereof. As a result of this, the lens barrel 120 is drawn out.

Next, if the zoom knob 136A is located at the wide position W, then the first slide lever 126 is moved in the left direction and, responsive to this, the switch lever 92 is rotated counter-clockwise about the shaft 80A, whereby the gear 96 is disengaged out of the gear 100 and the planetary gear 98 for "wide" is caused to mesh with the gear 100. At the same time, the tele-wide switch 137, 139 is turned on to reverse the direction of rotation of the motor 10, whereby the rotational power from the motor 10 is transmitted by means of the gear train of the gears 80→98→100→102→104→106→108→110 and thus the lens barrel feed-out lever 114 is rotated counter-clockwise about the shaft 114A thereof so as to draw in the lens barrel 120.

Next, if the main switch 146 is set at the OFF position, then the first slide lever 126 is moved in the left direction and, responsive to this, the pin 124 is rotated to switch the switch lever 92 over to the wide side. This reverse the direction of rotation of the motor 10 and thus the barrel 120 is drawn in the wide side and stored therein. After then, a barrier (not shown) is closed.

In the above-mentioned embodiment, although the first and second plane gear transmission mechanisms are connected with each other by means of the worm gear mechanism 104, other mechanisms may also be employed provided that they can change the direction of transmission by 90°, for example, a bevel gear, a high point gear, a screw gear and the like can be used.

As has been described above, in the camera according to the present invention, since the first plane gear transmission mechanism (gears 12~102) to be connected with the output gear of the motor is arranged within the plane parallel to the camera upper surface, the second plane gear mechanism (gears 106, 108, 110) to be connected with the drive member of the lens barrel is arranged within the plane parallel to the camera side surface, and these two plane gear transmission mechanisms are connected with each other by means of the worm gear 104, the camera, space can be utilized effectively and a large reduction ratio can be obtained.

Figure 5:
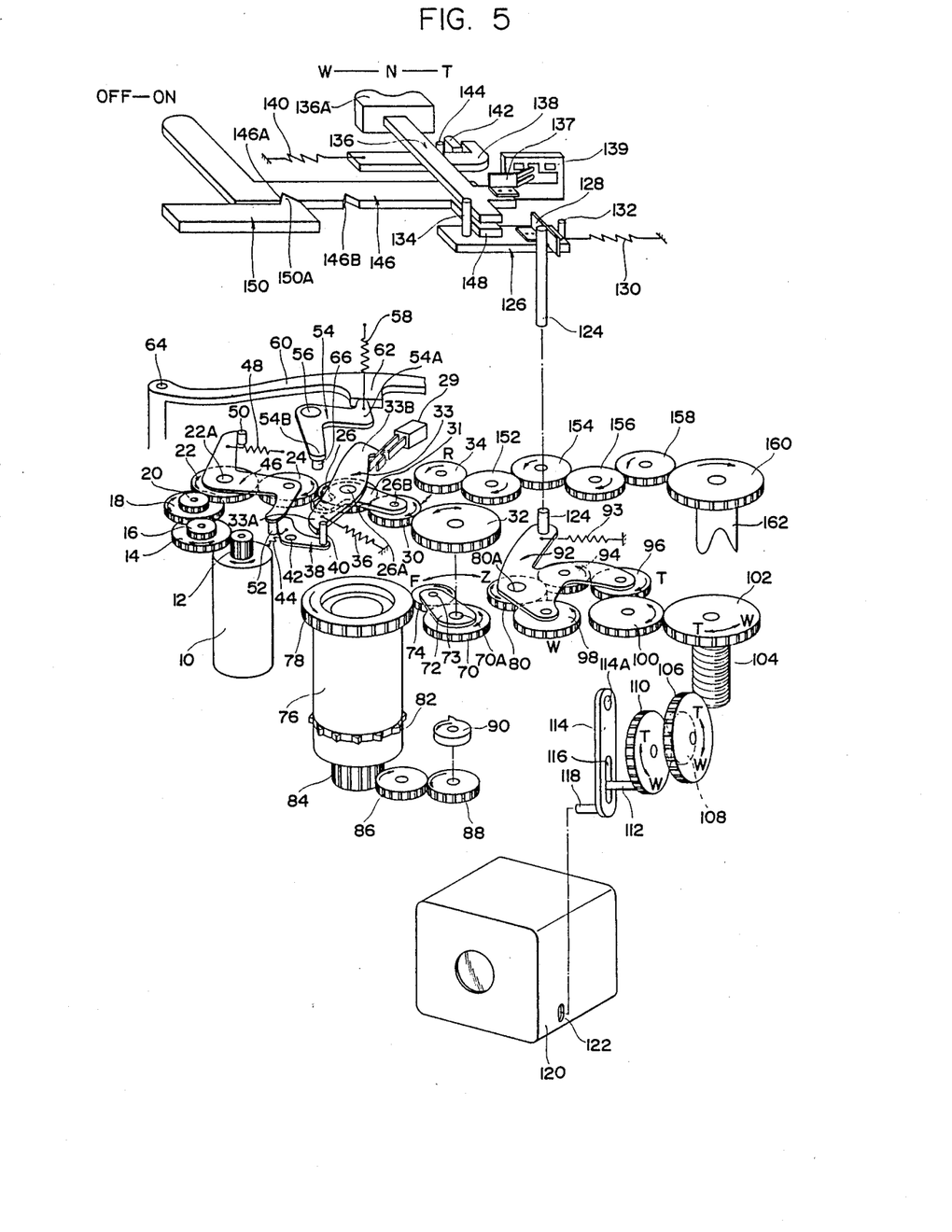
FIG. 5 is a perspective view of a gear transmission mechanism in a film feed device for use in a second embodiment according to the invention.
Figure 6:
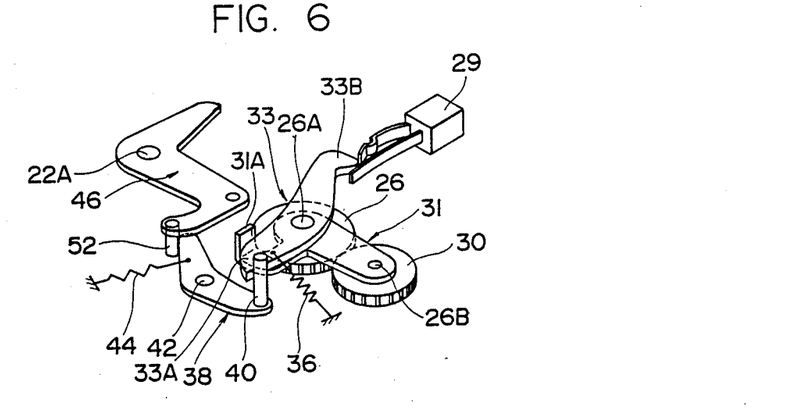
FIG. 6 is a perspective view of main portions in the second embodiment.

Now, referring to FIGS. 5 and 6, there is shown a second embodiment according to the present invention. The second embodiment shown in FIG. 5 is different from the first embodiment in FIG. 1 in the structure of the arm 28, but the remaining structures thereof are the same with the first embodiment and, accordingly, the same reference numerals are given to the same parts thereof. In the first embodiment in FIG. 1, the arm 28 is composed of a single member while in the second embodiment in FIG. 5 this part is composed of two members, that is, an arm 31 and a switch lever 33. In other words, the switch lever 33 is rotatably mounted coaxially with the arm 31. The switch lever 33 also has one end 33A provided with a spring 36 which energized the switch lever 33 in the counter-clockwise direction.

The one end 33A of the switch lever 33 is in engagement with the pin 40 planted on the engagement lever 38 and is held against the energizing force of the spring 36. On the other end of the switch lever 33, there is provided a projection 33B which is used to turn on or off the switch 29. That is, if the switch lever 33 is rotated in the counter-clockwise direction, then the switch 29 is switched from the on state over to the off state. Further, as shown in detail in FIG. 6, the arm 31 is provided in the end thereof with a bent piece 31A which is engageable with the side edge of the switch lever 33. By means of this, the arm 31 is prevented from rotating in the counter-clockwise direction by the switch lever 33.

The engagement lever 38 is journaled so as to rotate freely about the shaft 42 and is also energized by the spring 44 such that it can rotate in the counter-clockwise direction about the shaft 42, thereby energizing the switch lever 33 in the clockwise direction. As a result of this, the arm 31 is also energized in the clockwise direction, so that the planetary gear 30 can be held in the direction to mesh with the gear 32 in the film winding mechanism.

In the second embodiment constructed in the above-mentioned manner, the planetary gear 30 journaled on the arm 31 meshes with the gear 34 to perform the film winding operation, and the planetary gear 30 meshes with the gear 32 to rewind the film as well as to perform the operation of the focal distance varying mechanism. However, these operations are substantially similar to those in the first embodiment and thus the description thereof is omitted here. In the second embodiment, even after the film is rewound, it is possible to drive the lens barrel and perform operations such as an operation of sinking the lens barrel and the like without carrying out the reset operations such as an operation of opening the back cover. In other words, after completion of the film rewinding, in order to move the lens barrel 120, the following operations should be performed. That is, if the zoom knob 136A is moved onto the wide side W, then the tele-wide switch 137, 139 is turned on the rotate the motor 10 in the reverse direction. If the motor 10 is rotated in the reverse direction, then the arm 31 is rotated in the clockwise direction by means of the rotational force of the sun gear 26. At the time, due to the fact that the engagement is achieved only among the arm 31, switch lever 33 and bent piece 31A, in the clockwise rotation of the arm 31, the switch lever 33 provides no obstacle to the rotation and the energizing force of the spring 36 does not act on the arm 31. This allows the planetary gear 30 to intermesh with gear 32 in the focal distance changing mechanism and, even after the film is rewound, it is possible to drive the lens barrel 120 without performing the resetting operations such as the operation of opening the cover.

Figure 7:
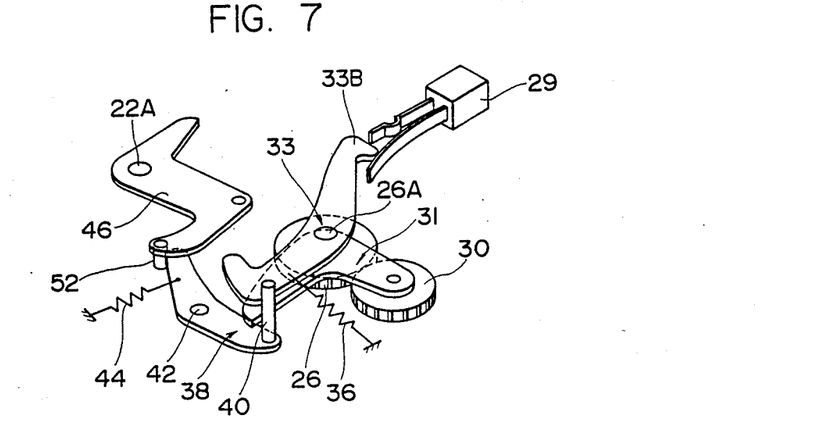
FIG. 7 is a partially perspective view of a third embodiment according to the invention.

Referring now to FIG. 7, there is shown the structure of a third embodiment according to the invention. In the second embodiment, as described before, the bent piece 31A is provided on the end of the arm 31, the bent piece 31A is brought into engagement with the switch lever 33, and the pin 40 on the engagement lever 38 is in contact with only the switch lever 33, while in the third embodiment the pin 40 on the engagement lever 38 is engageable with both of the switch lever 33 and arm 31. Even in this construction, after the film rewinding, if the motor 10 is rotated in the reverse direction, then the arm 31 can be rotated in the clockwise direction by the rotational force of the sun gear 26 without being influenced by the energizing force of the spring 36 and regardless of the lever 33, so that the planetary gear 30 is able to mesh with the gear 32 in the focal distance changing mechanism.

Figure 9:
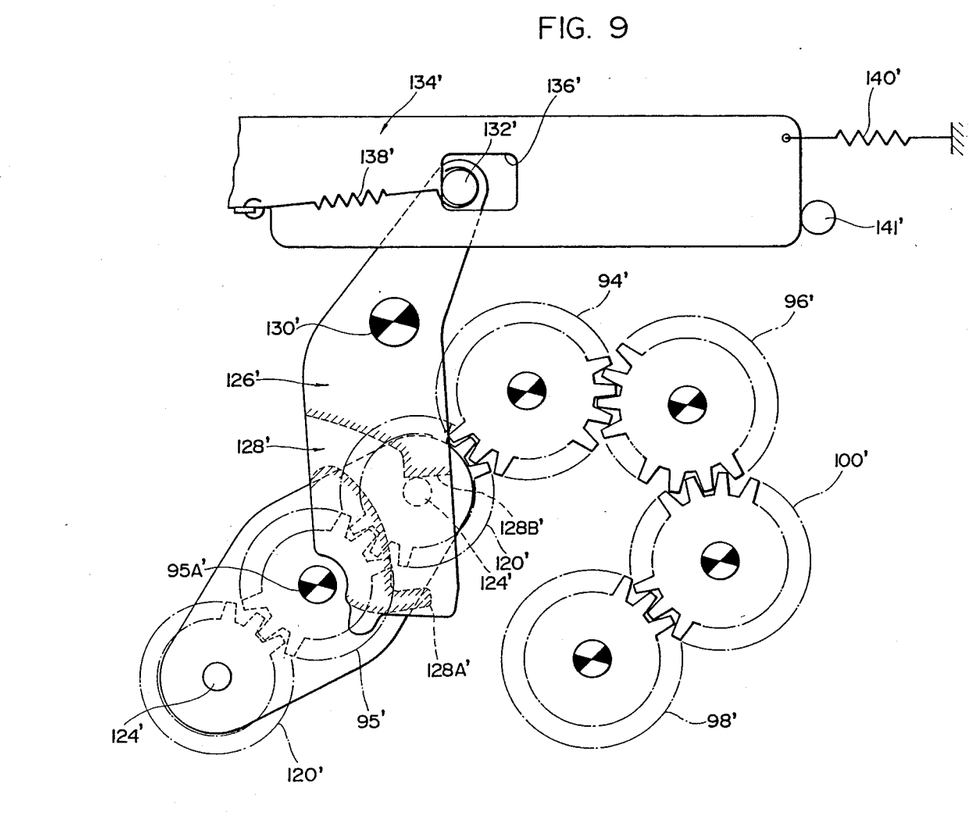
FIG. 9 is a plan view of a planetary clutch mechanism, illustrating a gear train in a "tele" mode in the fourth embodiment.
Figure 10:
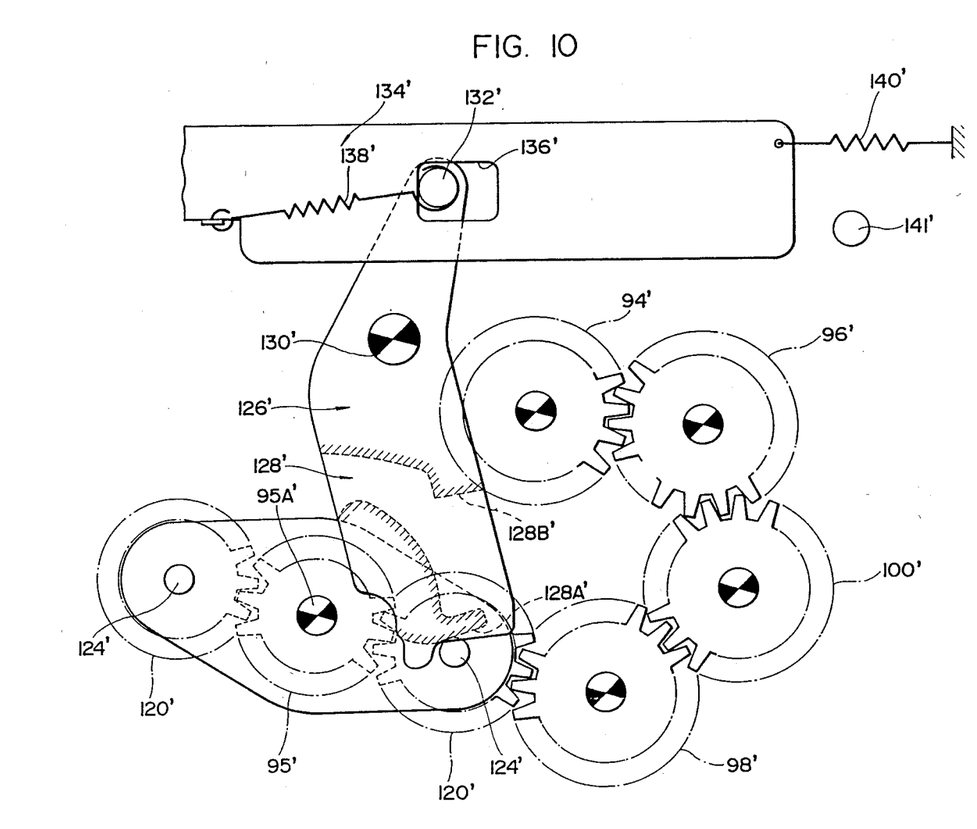
FIG. 10 is a plan view of the planetary clutch mechanism, illustrating a gear train in a "wide" mode in the fourth embodiment.

Now, description will be given below of a fourth embodiment according to the invention with reference to FIGS. 8~10.

Figure 8:
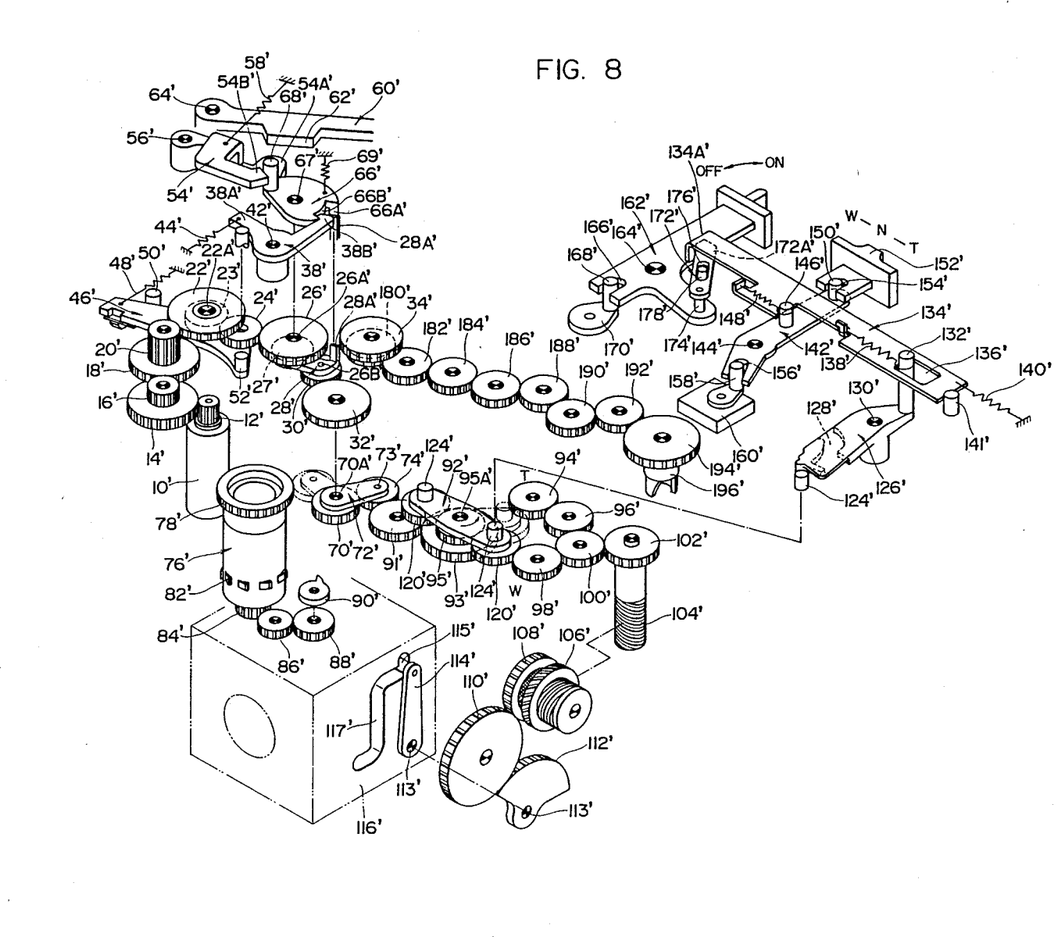
FIG. 8 is a perspective view of a gear transmission mechanism in a fourth embodiment according to the invention.

In FIG. 8, the output gear 12' of a motor 10' is connected through gears 14', 16', 18', 20', 22', 23', 24' to a gear 26'. On the rear surface of the gear 26', there is formed sun gear 27' integrally therewith in the form of a two-stage gear. An arm 28' is journaled on the center shaft 26A' of the sun gear 27'. On the end portion of the arm 28' there is planted a pin 26B', and a planetary gear 30', which is journaled by the pin 26B', intermeshes with the sun gear 27'. The sun gear 27' planetary gear 30' and arm 28' form a first planetary clutch mechanism which switches a film winding mechanism (or a focal distance changing mechanism) and a film rewinding mechanism over to each other. In other words, the planetary gear 30' can be switched over to either a gear 32' in the film winding mechanism or a gear 34' in the film rewinding mechanism, according to the direction of rotation of the sun gear 27'.

Next, we will explain about a torque detect mechanism. A torque detect lever 46', which is journaled on the shaft 22A' of the sun gear 23', is rotationally energized clockwise by a spring 48' and abutts against a stopper 50'. On the torque detect lever 46' there is journaled the planetary gear 24' which intermeshes with the sun gear 23'. On the end portion of the torque detect lever 46' there is planted a pin 52' which is in contact with one end 38A' of an engagement lever 38'. The engagement lever 38', which is formed substantially in an L shape, is journaled rotatably about a shaft 42' and is also energized in the counter-clockwise by a spring 44', which is provided on the one end 38A' of the engagement lever 38', such that it is rotatable about the shaft 42'. The other end 38B' of the engagement lever 38' is engaged in a recessed portion 66B' in a lever 66' which will be discussed later. When the sun gear 27' is caused to stop rotation by the film end, then the gear 24' and torque detect lever 46', due to the rotational power of the motor 10', are rotated counter-clockwise about the shaft 22A' of the sun gear 23' against the energizing force of a spring 48' which is provided round the sun gear 23', with the result that the engagement lever 38' can be rotated clockwise about the shaft 42' against the energizing force of a spring 44'.

On the other hand, on the other end of the arm 28' there is formed a bent portion 28A' which is in engagement with a suspension piece 66A' provided in the lever 66'. The lever 66' is supported so as to be free to rotate about a shaft 67' and is also energized in the counter-clockwise direction by a spring 69'. If the engagement lever 38' is rotated clockwise, then the end portion 38B' of the lever is disengaged out of the recessed portion 66B' of the lever 66', allowing the planetary gear 30' to mesh with the gear 34' in the rewinding mechanism.

Next, description will be given below of a reset mechanism of the first planetary clutch mechanism (the sun gear 27', planetary gear 30', arm 28'). A back cover opening/closing detect lever 54' is journaled rotatably about a shaft 56' and is also energized by a spring 58' so as to be rotatable counter-clockwise about the shaft 56', while one end 54A' thereof can be brought into contact with the receiving portion 62' of a back cover 60'. Therefore, if the back cover 60' is rotated counter-clockwise about a opening/closing shaft 64' and is opened, then the back cover opening/closing detect lever 54' is removed from its restraint by the back cover 60' and, due to the energizing force of the spring 58', is rotated counter-clockwise about the shaft 56'. This causes the end portion 54B' of the lever 54' to press against the pin 68' to thereby rotate the lever 66' clockwise against the energizing force of the spring 69'. If the lever 66' is rotated clockwise, then, due to the fact that the lever 66' is in engagement with the arm 28' through the suspension piece 66A' and bent piece 28A', the lever 66' presses against the arm 28' to rotate it in the clockwise direction, with the result that the gear 34' is disengaged out of the gear 30' to thereby forcibly rotate the arm 28' in the clockwise direction. As a result of this, the planetary gear 30' is disengaged out of the gear 34' in the rewinding mechanism and is then allowed to mesh with the gear 32' in the film winding mechanism, which completes the reset operation.

Next, the film winding mechanism will be described below. As shown in FIG. 8, to the gear 32' in the film winding mechanism there is mounted a sun gear 70' integrally and coaxially therewith and the gear 70' has a shaft 70A' on which an arm 72' is journaled. On the arm 72' there is planted a pin 73' on which a planetary gear 74' is journaled. The sun gear 70' arm 72' and planetary gear 74' form a second planetary clutch mechanism which is used to switch the film winding mechanism and focal distance changing mechanism over to each other. The planetary gear 74' is adapted such that it is able to mesh with either a spool gear 78' provided on the upper end of a spool 76' or a gear 91' in the focal distance changing mechanism, responsive to the switching of the forward or reverse rotation of the motor 10'. In the outer periphery of the spool 76' in the film winding mechanism, there is formed a claw 82' which is adapted to be engageable with perforations formed in the film and, in the lower end portion of the spool 76', there is formed a gear 84' which meshes with gears 86'-88'. Coaxially with the gear 88', there is provided a one-tooth gear 90' which is used to perform a film initial feed operation until the leader portion of the film is wound round the claw 82' of the spool 76'.

Next, the focal distance varying mechanism will be described below. A gear 91' meshes with a gear 93' in which there is formed a sun gear 95' integrally and coaxially therewith in the form of a two-state gear. The gear 95' has a rotary gear 95A' on which there is provided a witch lever 92' for switching the driving direction of a lens barrel 116' to be discussed later, and on both ends of the switch lever 92' there are journaled planetary gears 120', 120' which mesh with the sun gear 95', respectively. If the sun gear 95' is rotated counter-clockwise to produce a friction force between the sun gear 95' and lever 92', which causes the lever 92' to rotate. The rotation of the lever 92' causes the planetary gear 120' to mesh with either the gear 94' or the gear 98'. The gears 94' and 98' are positioned such that they are able to mesh with the planetary gear 120' and also the planetary gear 120' is able to make one revolution round the sun gear 95'. Accordingly, the planetary gear 120' has a neutral position relationship with respect to the sun gear 95' and the tele-side gear 94' or wide-side gear 98' in which the former is not biting the latter deeply nor it is escaping therefrom. The gears 94'→96'→100' form a gear train which is used to drive the lens barrel in the tele-direction, while the gears 98'→100 form a gear train which is used to drive the lens barrel in the wide direction. Therefore, by rotating the switch lever 92' about the shaft 95A' the tele-direction gear train can be formed or the wide-direction gear train can be formed. In the present embodiment, the switch lever 92' can be rotated only in one direction, that is, in the counter-clockwise direction and the planetary gear 120' is adapted to mesh with the gears 98' and 94' sequentially.

Further, the gear meshes 100' with a gear 102' which is provided a worm 104'. The worm 104' meshes with a gear 106', and also a gear 108', provided coaxially with the gear 106', meshes with a gear 110' which in turn meshes with a sector gear 112'. The sector gear 112' has a shaft 113' which is formed coaxially with the shaft of a lens barrel draw-out lever 114'. On the tip end of the lens barrel draw-out lever 114' there is provided a pin 115' and in the lens barrel 116' there is formed a guide hole 117' into which the pin 115' is fitted. Therefore, by means of rotation of the gear 110', the lens barrel draw-out lever 114' can be swung about the shaft 113', whereby the lens barrel 116' can be moved back and forth.

Next, description will be given of a zoom switch mechanism. On the two end portions of the lever 92' for switching the driving direction of the lens barrel, there are planted pins 124', 124' coaxially with gears 120', 120'. The pin 124' is adapted to pass through a cam groove 128' formed on the back surface of a first zoom lever 126'. In the cam groove 128' as shown in FIGS. 9 and 10, there are formed a stopper portion 128A' for the wide side and a stopper portion 128B' for the tele side. If the switch lever 92' is rotated counter-clockwise to bring the pine 124' into contact with the wide-side stopper portion 128A', then the meshing positions of the planetary gear 120' and gear 98' are restricted, thereby causing the planetary gear 120' to mesh with the gear 98'. Similarly, if the pin 124' is brought into contact with the tele-side stopper portion 128B', then the meshing positions of the planetary gear 120' and gear 94' are restricted, thereby causing the planetary gear 120 to mesh with the gear 94'. The planetary gears 120', in the present embodiment, are provided on the two ends of the switch lever 92', but this is not limitative. For example, they may be provided only in one side portion of the switch lever 92', or three planetary gears may be provided in the circumference of a circle.

As shown in FIG. 8, the first zoom lever 126' is supported such that it is free to rotate about a shaft 130' and it is provided with a pin 132' planted on the end thereof. The pin 132' is disposed in an elongated hole 136' formed in a second zoom lever 134' and is also connected to a second zoom lever 134' by means of a spring 138'. The second zoom lever 134' is drawn in the right direction in FIG. 8 by a spring 140' and is also in contact with a stopper 141'. The spring 140' is adapted to give an energizing force in the return direction when the second zoom lever 134' is held at the wide position.

A third zoom lever 142' is supported such that it is free to rotate about a shaft 144', and there is planted on the third zoom lever 142' a pin 146' which is in turn connected with the second zoom lever 134' via a spring 148'. Further, on the end of the third zoom lever 142' there is planted a pin 150' which is connected to a zoom knob 152' via a U-shape groove 154'. Therefore, if the zoom knob 152' is moved in the right and left direction, then the third zoom lever 142' is caused to swing about a shaft 144' to thereby move the second zoom lever 134' in the right and left direction. If the zoom knob 152' is moved in the right direction, then the third zoom lever 142' is caused to swing about the shaft 144' but the second zoom lever 134' is not moved because it is abutted against the stopper 141', with the result that only a tele-wide switch 160' can be set. On the other end of the third zoom lever 142', there is formed a U-shaped groove 156' in which a pin 158' is fitted. The pin 158' is connected with the tele-wide switch 160'.

A main switch lever 162' is supported rotatably abut a shaft 164' and is formed in one end thereof with a U-shaped groove 166'. In the U-shaped groove 166' there is fitted a pin 168' which is connected with a main switch 170'. Also, on the main switch lever 162' there is journaled a lock lever 172' through a pin 174', which lock lever 172' is formed with an elongated bore 176'. A pin 178' provided on the main body side is fitted into the elongated bore 176' and, at the OFF position of the main switch lever 162', the contact portion 172A' of the lock lever 172' is moved in the left direction to lock the bent piece 134A' of a second zoom lever 134'. The leftward movement of the second zone lever 134' causes the first zoom lever 126' to move to the wide position and, due to rotation of the motor, the planetary gear 120' meshes with the gear 98' on wide side to sink the lens barrel, thereby causing the motor to stop.

Next, we will describe the film rewinding mechanism. A gear 180' in the form of a two-stage gear is provided integrally and coaxially with the gear 34' in the film rewinding mechanism and the gear 180' is also connected with gears 182', 184', 186', 186', 188', 190', 192', 194'. On the lower surface of the gear 194' there is provided a patrone fork 196' which is engageable with the winding core of the film patrone.

Now, description will be given below of the operation of the embodiment of the planetary clutch mechanism of a camera according to the invention constructed in the above-mentioned manner.

At first, the film winding operation will be discussed. Due to the energizing forces of the spring 44' of the engagement lever 38' and spring 48' of the torque detect lever 46', the engagement lever 38' and torque detect lever 46' take the positions shown in FIG. 8 and the arm 28' is located at a position shown in FIG. 8. Therefore, the planetary gear 30' is intermeshing with the gear 32' in the film winding mechanism. In this state, if the motor 10' is rotated in the forward direction, then the rotational power of the motor is transmitted to the film winding mechanism by means of a gear train of gears 12'→14'→16'→18'→20'→22'→23'→24'→26'→27'→30'→32'. By means of the power transmission, the gear 32' is rotated in the counter-clockwise direction and the arm 72' is rotated in the counter-clockwise direction, so that the planetary gear 74' is allowed to mesh with the gear 78' of the spool 76'. As a result of this, the spool 76' is rotated in the counter-clockwise direction by means of the gears 32'→70'→74'→78' and thus a film (not shown) can be wound round the spool 76'.

The film rewinding operation is performed as follows. When the photographing is completed and the whole length of the film is wound round the spool 76', the end of the film is in engagement with the winding core of the film patrone and, therefore, at the end of the film winding operation, it is impossible for the spool 76' to be rotated in spite of the rotational power of the motor 10'. In this state, if the motor 10' tries to rotate further, then due to the rotational torque from the motor 10' the torque detect lever 46' can be rotated about the shaft 22A' in the counter-clockwise direction against the energizing force of the spring 48'. When the torque detect lever 46' is rotated counter-clockwise, then the engagement lever 38' is rotated clockwise about the shaft 42' against the energizing force of the spring 44', since the engagement lever 38' is in contact with the pin 52' of the torque detect lever 46'. The clockwise rotational movement of the engagement lever 38' removes the engagement between the end portion 38B' of the engagement lever 38' and the recessed portion 66B' of the lever 66' and also causes the arm 28' to rotate counter-clockwise about the shaft 26A', so that, due to the rotational movement of the sun gear 26', the planetary gear 30' is rotated counter-clockwise to mesh with the gear 34' in the rewinding mechanism. As a result of this, the motor 10' is connected with the rewinding mechanism, the patrone form 196' is rotated by means of a gear train of gears 12'→14'→16'→18'→20'→22'→23'→24'→26'→27'→30'→34'→180'→182'→184'→186'→188'→190'→192'→194', and the film is rewound into a patrone (not shown).

As mentioned above, in the embodiment according to the present invention, it is possible to perform both film winding and rewinding operations by means of the forward rotation of the motor 10'.

Next, description will be given below of the operation of the focal distance changing mechanism. At first, when the zoom knob 152' is set at the neutral position N, the tele-wide switch 160' is off and thus the motor 10' does not rotate. Next, if the zoom knob 152' is held at the tele-position T, then the tele-wide switch 160' is turned on to rotate the motor 10' in the reverse direction, and the rotational power from the motor 10' is transmitted to the gear 32' by means of gears 12'→14'→16'→18'→20'→22'→23'→24'→26'→27'→30'→32', in the form of the clockwise rotational power. When the gear 32' is rotated clockwise, then the sun gear 70' is rotated clockwise to thereby rotate the arm 72' clockwise, so that the planetary gear 74' is allowed to mesh with the gear 91' in the focal distance changing mechanism. Since the gear 91' is meshing with the gear 93', at this time the switch lever 92' is rotated counter-clockwise by means of rotation of the gear 93'. At this time, the first zoom lever 126' is positioned on the tele-side by means of operation of the zoom knob 152', the lever 92' is restricted in position to a position where the planetary gear 120' meshes with the gear 94', and the rotational power from the motor 10' is transmitted to the lens barrel draw-out lever 114' by means of the gears 91'→93'→95'→120'→94'→96'→100'→102'→104'→106'→108'→110'→112', thereby rotating the level 114' counter-clockwise about the shaft 113A'. As a result of this, the lens barrel 120' is drawn out. At this time, since the pin 124' provided coaxially with the planetary gear 120', as shown in FIG. 9, is in contact with the stopper portion 128B' of the cam groove 128', the meshing position of the planetary gear 120' to mesh with the gear 94' is restricted to thereby cause the planetary gear 120' to mesh with the gear 94', so that the rotational power can be duly transmitted.

Then, when the zoom knob 52A' is set at the wide position W, then the third zoom lever 142' is rotated counter-clockwise about the shaft 144', when the tele-wide switch 160' is turned on to rotate the motor 10'. At the same time, the third zoom lever 142' moves the second zoom lever 134' in the leftward direction through the pin 146' against the energizing force of the spring 140'. When the second zoom lever 134' is moved left, then the first zoom lever 126' is rotated counter-clockwise about the shaft 130' and stops at a position shown in FIG. 10. At this time, the switch lever 92' is rotated counter-clockwise about the shaft 95A', with the result that the planetary gear 120' is disengaged out of the gear 94' and at the same time the other planetary gear 120' meshes with the wide-side gear 98'. When the tele-wide switch 160' is turned on, then the motor 10' is rotated in the reverse direction, whereby the rotational power from the motor 10' is transmitted to the lens barrel draw-out lever 114' by means of a gear train of gears 91'→93'→95'→120'→98'→100'→102'→104'→106'→108'→110'→112' to rotate the lever 114' clockwise about the shaft 113', so that the lens barrel 120' can be drawn in. At this time, due to the fact that the pin 124' provided coaxially with the planetary gear 120' to mesh with the gear 98' is in contact with the stopper portion 128A' of the cam groove 128' as shown in FIG. 10, the amount of biting of the gear 120' is limited, thereby eliminating the possibility that the gear 120' bites the gear 98' too deep to part therefrom.

Next, if the main switch lever 162' is set at the OFF position, then the second zoom lever 134' is moved left and the lock lever 134' locks the second zoom lever 134', when the main switch 170' is turned off.

As has been described hereinbefore, in the camera according to the present invention, since in the planetary clutch mechanism of the focal distance changing mechanism there are provided a planetary gear which is able to make one revolution round a sun gear, a driven gear on the tele-side or on the wide side which is adapted to mesh with the planetary gear, and a stopper mechanism for restricting the meshing position of the planetary gear, there is eliminated the possibility that the planetary gear may bite the driven gear deep or escape from the driven gear, so that power can be stably transmitted to the driven gear on the tele side or on the wide side.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera comprising:
   a film winding mechanism for drawing out a film from a patrone to wind the same around a spool;
   a film rewinding mechanism for rewinding said film from said spool into said patrone;
   a first planetary clutch mechanism for transmitting rotational power from a motor to said film winding mechanism or to said film rewinding mechanism by rotation of said motor in the same direction during film winding as during film rewinding;
   an engagement member for holding said first planetary clutch mechanism in such a manner that said first planetary clutch mechanism can be connected with said film winding mechanism; and,
   a torque detect mechanism which is operative, upon detecting a given torque at the end of winding of the whole film, to drive said engagement member to release the holding of said first planetary clutch mechanism by said engagement member so as to connect said first planetary clutch mechanism with said film rewinding mechanism.

2. A camera as set forth in claim 1, further including:
   a focal distance varying mechanism for drawing out or in a taking lens barrel to vary a focal distance; and,
   a second planetary clutch mechanism for switching said rotational power from said motor from said film winding mechanism over to said focal distance varying mechanism.

3. A camera as set forth in claim 2, further including a zoom switch mechanism being connected with said focal distance varying mechanism and being operable from externally of said camera.

4. A camera as set forth in claim 3, further including a back cover opening/closing detect lever being energized in one direction and supported by a camera back cover at a camera back cover closed position, said detect lever being rotatable by an energizing force at a camera back cover open position to switch said first planetary clutch mechanism from said film rewinding mechanism over to said film winding mechanism.

5. A camera as set forth in claim 4, further including:
   a first plane gear transmission mechanism disposed in a plane parallel to the upper surface of said camera and having an input side connected with the output gear of said motor;
   a second plane gear transmission mechanism disposed in a plane parallel to the side surface of said camera and having an output side connected with a drive member for said taking lens barrel; and,
   a gear mechanism for connecting said first plane gear transmission mechanism with said second plane gear transmission mechanism.

6. A camera as set forth in claim 2 comprising:
   a first planetary clutch mechanism including a sun gear, an arm journaled coaxially with said sun gear, and a planetary gear meshing with said sun gear and journaled on said arm, for transmitting said rotational power from said motor to said film winding mechanism or to said film rewinding mechanism;
   a switch lever journaled coaxially with said arm for opening or closing a switch for detecting a film winding or rewinding state;
   an elastic member for energizing said switch lever in the direction of the detected state of film rewinding;
   an engagement member for holding said arm of said first planetary clutch mechanism such that said planetary gear of said first planetary clutch mechanism can be connected with said film winding mechanism, and also for holding said switch lever against the energizing force of said elastic member; and,
   a torque detect lever, on detecting a given torque at end of winding of the whole film, for driving said engagement member to remove its holding of said arm of said first planetary clutch mechanism and said switch lever so as to connect said planetary gear of said first planetary clutch mechanism with said film rewinding mechanism.

7. A camera as set forth in claim 6, wherein in said focal distance varying mechanism there is provided a third planetary clutch mechanism for transmitting said rotational power of said motor to a gear train used for a tele-mode or a wide mode to thereby advance or retreat said taking lens barrel, a planetary gear included in said third planetary clutch mechanism is arranged such that it is able to make one revolution round the outer periphery of a sun gear and also to mesh with a driven gear in said tele-mode gear train or in said wide mode gear train, and there is provided a stopper mechanism for restricting the meshing position of said planetary gear with said driven gear in said tele-mode gear train or in said wide mode gear train when operating said zoom switch mechanism.

8. A camera comprising:
   a film winding device for winding a film from a cartridge around a winding spool;
   a film rewinding device for rewinding said film from said spool into said cartridge;
   a motor for driving said film winding and rewinding devices by rotation of said motor in the same direction during film winding as during film rewinding;
   a detecting device for detecting the completion of the film winding by said film winding device; and, means for switching transmission of the driving force of said motor from said film winding device to said film rewinding device when said detecting device completes the film winding.

9. A camera as set forth in claim 8, further including:
a taking lens having a device capable of varying a focal distance;
switch means for driving and rotating said motor in the opposite direction to the direction of rotation of said film winding and rewinding devices; and,
a device, when said switch means is operated manually to thereby rotate said motor in said opposite direction, for transmitting the driving force of said motor to said focal distance varying device of said taking lens and for cutting off the transmission of the driving force of said motor to said film winding and rewinding devices.

10. A camera as set forth in claim 8, wherein said film winding completion detecting device is a torque detect device which can be operated when the tension of said film at the film winding completion is equal to or more than a predetermined level, and said transmission switching device includes a planetary gear, when said torque detect device is operated, switchable from engagement with a gear for transmitting said driving force to said film winding spool to engagement with a gear for driving said cartridge.

* * * * *